(12) United States Patent
Chen et al.

(10) Patent No.: US 11,252,592 B2
(45) Date of Patent: Feb. 15, 2022

(54) WIRELESS COMMUNICATION METHOD, TERMINAL DEVICE AND TRANSMITTING NODE

(71) Applicant: GUANGDONG OPPO MOBILE TELECOMMUNICATIONS CORP., LTD., Guangdong (CN)

(72) Inventors: Wenhong Chen, Guangdong (CN); Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 135 days.

(21) Appl. No.: 16/644,898

(22) PCT Filed: Sep. 8, 2017

(86) PCT No.: PCT/CN2017/101133
§ 371 (c)(1),
(2) Date: Mar. 5, 2020

(87) PCT Pub. No.: WO2019/047185
PCT Pub. Date: Mar. 14, 2019

(65) Prior Publication Data
US 2020/0267582 A1 Aug. 20, 2020

(51) Int. Cl.
*H04W 24/10* (2009.01)
*H04B 7/06* (2006.01)
(Continued)

(52) U.S. Cl.
CPC .......... *H04W 24/10* (2013.01); *H04B 7/0626* (2013.01); *H04B 7/0639* (2013.01);
(Continued)

(58) Field of Classification Search
CPC ... H04W 24/10; H04W 72/042; H04W 72/06; H04W 24/00; H04B 7/0626;
(Continued)

(56) References Cited

U.S. PATENT DOCUMENTS

| 2013/0077581 A1 | 3/2013 | Lee et al. |
| 2013/0100875 A1* | 4/2013 | Chun ............. H04B 7/024 370/312 |

(Continued)

FOREIGN PATENT DOCUMENTS

| CN | 101369672 A | 2/2009 |
| CN | 101801697 A | 8/2010 |

(Continued)

OTHER PUBLICATIONS

Guangdong Oppo Mobile Telecom: "Discussion on NR Uplink Multi-TRP and Multi-panel Transmission". 3GPP Draft;R1-1713284, 3rd Generation Partnership Project (3GPP), Mobile Competence Centre;650, Route Des Lucioles,F-06921 Sophia-Antipolis Cedex; France vol. RAN WG1, No. Prague, Czech Republic; Aug. 21, 2017-Aug. 25, 2017 Aug. 20, 2017, XP051316091, [retrieved on Aug. 20, 2017] * sections 2.2, 2.3 * .

(Continued)

*Primary Examiner* — Kiet Tang
(74) *Attorney, Agent, or Firm* — Ladas & Parry LLP

(57) ABSTRACT

Provided in embodiments of the present application are a wireless communication method, a terminal device, and a transmitting node, which can implement measurement and feedback of reference signals supporting multiple downlink channel transmissions. The method comprises: the terminal device determines a mode for reporting a measurement result of a plurality of reference signals; and the terminal device reports report information including a rank indication corresponding to each of the plurality of reference signals (Continued)

according to the determined mode and the measurement result. The reporting mode determined by the terminal device is a first mode or a second mode. In the first mode, the maximum value of the rank indication in the report information corresponding to each reference signal does not exceed a first predetermined value, and in the second mode, the maximum value of the sum of rank indication values in the report information corresponding to the plurality of reference signals does not exceed a second predetermined value.

19 Claims, 4 Drawing Sheets

(51) Int. Cl.
  *H04L 1/00* (2006.01)
  *H04L 1/06* (2006.01)
  *H04L 5/00* (2006.01)
  *H04W 72/04* (2009.01)
  *H04W 72/06* (2009.01)
(52) U.S. Cl.
  CPC .............. *H04L 1/0026* (2013.01); *H04L 1/06* (2013.01); *H04L 5/0048* (2013.01); *H04W 72/042* (2013.01); *H04W 72/06* (2013.01)
(58) Field of Classification Search
  CPC .... H04B 7/0639; H04B 7/0645; H04B 7/063; H04B 7/024; H04L 1/0026; H04L 1/06; H04L 5/0048; H04L 1/0031; H04L 5/0035; H04L 1/1861; H04L 5/0057
  See application file for complete search history.

(56) References Cited

U.S. PATENT DOCUMENTS

| | | | |
|---|---|---|---|
| 2015/0029971 A1* | 1/2015 | Nishio ................. | H04L 5/0057 370/329 |
| 2015/0109949 A1 | 4/2015 | Xia et al. | |
| 2016/0006553 A1* | 1/2016 | Kim ..................... | H04L 1/1861 370/252 |
| 2016/0277090 A1 | 9/2016 | Kim et al. | |

FOREIGN PATENT DOCUMENTS

| | | |
|---|---|---|
| CN | 103220068 | 7/2013 |
| CN | 104579586 | 4/2015 |
| CN | 106788875 | 5/2017 |
| EP | 3627731 A1 | 3/2020 |
| JP | 2017098997 A | 6/2017 |
| KR | 20140041422 A | 4/2014 |
| RU | 2618384 C2 | 5/2017 |
| RU | 2600533 C1 | 10/2018 |
| SG | 11201912158 U | 1/2020 |
| WO | 2014129843 A1 | 8/2014 |

OTHER PUBLICATIONS

Intel Corporation: "Discussion on rank indicator(RI)report for CoMP", 3GPP Draft;R1-122631 Discussion on rank Indicator Reports(RI) for Comp,3rd Generation Partnership Project (3GPP),Mobile Competence Center;650,Route Des Lucioles,F-06921 Sophia-Antipolis Cedex;France, vol. RAN WG1, No. Prague, Czech; May 21, 2012-May 25, 2012, May 12, 2012 (May 12, 2012), XP050600816, [retrieved on May 12, 2012 ] * section 2 *.
Supplementary European Search Report in the European application No. 17924347.2, dated Aug. 24, 2020.
Intel Corporation. "Support of NC-JT In NR". 3GPP TSG RAN WG1 Meeting #89 R1-1707353 Hangzhou, P.R. China May 15-19, 2017
AT&T. "Support multiple DCI based transmission", 3GPP TSG RAN WG1 Meeting #89 R1-1707760 Hangzhou, China, May 15-19, 2017.
Samsung "Discussions on NR DL mualti-TRP and mute-panel support", 3GPP TSG RAN WG1 Meeting #89 R1-1707948 Hangzhou, China, May 15-19, 2017.
Written Opinion of the International Search Authority in the interational application No. PCT/CN2017/101133, dated Jun. 1, 2018.
International Search Report in the international application No. PCT/CN2017/101133, dated Jun. 1, 2018.
Office Action of the Indian application No. 202017014996, dated May 22, 2021.
Huawei, HiSilicon. "CSI acquisition details tor NCJT". 3GPP TSG RAN WG1 Meeting #90 R1-1713760, Prague, Czech Republic, Aug. 21-25, 2017.
First Office Action of the Japanese application No. 2020-513716, dated Jul. 20, 2021.
Notice of Allowance of the Russian application No. 2020112733, dated Nov. 17, 2020.
First Office Action of the Korean application No. 10-2020-7009228, dated Aug. 26, 2021.
Written Opinion of the Singaporean application No. 11202001980X, dated Sep. 10, 2021.

* cited by examiner

WIRELESS COMMUNICATION METHOD, TERMINAL DEVICE AND TRANSMITTING NODE

RELATED APPLICATION

This application is an application under 35 U.S.C. 371 of International Application No. PCT/CN2017/101133 filed on Sep. 8, 2017, the entire contents of which are incorporated herein by reference.

TECHNICAL FIELD

The application relates to the field of communication, and more particularly to a wireless communication method, a terminal device and a transmission node.

BACKGROUND

In a present New Radio (NR) system, multiple transmission nodes may jointly send Physical Downlink Control Channel (PDCCH) or Physical Downlink Shared Channel (PDSCH) to a terminal device.

Therefore, how to implement measurement and feedback for reference signals to support transmission of multiple downlink channels is a problem urgent to be solved.

SUMMARY

Embodiments of the application provide a wireless communication method and device, which may implement measurement and feedback for reference signals that support transmission of multiple downlink channels.

A first aspect provides a wireless communication method, which may include the following operations.

A terminal device determines a mode for reporting measurement results for a plurality of reference signals.

The terminal device reports, according to the determined mode and the measurement results, each of a plurality pieces of reporting information, corresponding to a respective one of the plurality of reference signals, including a Rank Indicator (RI). The mode determined by the terminal device may be a first mode or a second mode. In the first mode, a value of the RI in the each of the plurality pieces of reporting information may be less than or equal to a first predetermined value. In the second mode, a value of a sum of values off the RIs in the plurality pieces of reporting information may be less than or equal to a second predetermined value.

Accordingly, in the embodiments of the application, the terminal device measures the multiple reference signals, the terminal device determines, according to the measurement results each of a plurality pieces of the reporting information, corresponding to a respective one of the plurality of reference signals, including the RI, and the terminal device sends each of the plurality pieces of reporting information, corresponding to a respective one of the plurality of reference signals, including the RI to a network side, so that measurement and feedback for the reference signals that support transmission of multiple downlink channels are implemented. Moreover, the mode for reporting the reporting information determined by the terminal device is the first mode or the second mode, so that the number of transmission layers of the downlink channels to be sent to the terminal device by the network side may be limited as much as possible on a terminal side.

In combination with the first aspect, in a possible implementation mode of the first aspect, each of the plurality of reference signals may be from a respective one of a plurality of transmission nodes serving the terminal device or a respective one of a plurality of downlink sending beams.

In combination with the first aspect or any abovementioned possible implementation mode, in another possible implementation mode of the first aspect, the first predetermined value may be less than or equal to a value corresponding to a capability of the terminal device and/or less than or equal to a number of ports, configured for the terminal device, corresponding to each of the plurality of reference signal.

In combination with the first aspect or any abovementioned possible implementation mode, in another possible implementation mode of the first aspect, the second predetermined value may be less than or equal to the value corresponding to the capability of the terminal device.

In combination with the first aspect or any abovementioned possible implementation mode, in another possible implementation mode of the first aspect, the operation that the terminal device determines the mode for reporting the measurement results for the plurality of reference signals may include the following operation.

When the terminal device does not receive configuration information configured by a network device for the mode, the terminal device determines to report the measurement results for the plurality of reference signals by using the first mode.

In combination with the first aspect or any abovementioned possible implementation mode, in another possible implementation mode of the first aspect, before the operation that the terminal device determines the mode for reporting the measurement results for the plurality of reference signals, the method may further include the following operation.

The terminal device receives configuration information. The configuration information is used to configure the mode.

In combination with the first aspect or any abovementioned possible implementation mode, in another possible implementation mode of the first aspect, the configuration information may be used to configure the terminal device to report the measurement results for the plurality of reference signals by using the first mode.

In combination with the first aspect or any abovementioned possible implementation mode, in another possible implementation mode of the first aspect, the configuration information may be used to configure the terminal device to report the measurement results for the plurality of reference signals by using of the second mode.

In combination with the first aspect or any abovementioned possible implementation mode, in another possible implementation mode of the first aspect, the configuration information may further contain the second predetermined value.

In combination with the first aspect or any abovementioned possible implementation mode, in another possible implementation mode of the first aspect, the configuration information may further contain the value of the RI in the each of the plurality pieces of reporting information.

In combination with the first aspect or any abovementioned possible implementation mode, in another possible implementation mode of the first aspect, the value of the RI in the each of the plurality pieces of reporting information in the second mode may be a third predetermined value.

In combination with the first aspect or any abovementioned possible implementation mode, in another possible implementation mode of the first aspect, the third predetermined value may be obtained by lower rounding a value obtained by dividing the value corresponding to the capability of the terminal device by a number of the plurality of reference signals; or, the third predetermined value may be equal to a minimum value among the value corresponding to the capability of the terminal device and the number of ports corresponding to the plurality of the corresponding reference signals.

In combination with the first aspect or any abovementioned possible implementation mode, in another possible implementation mode of the first aspect, configurations of different reference signals in the configuration information may be distinguished through indexes of the different reference signals.

In combination with the first aspect or any abovementioned possible implementation mode, in another possible implementation mode of the first aspect, the configurations of different reference signals in the configuration information may be distinguished through indexes of reporting information corresponding to the different reference signals.

In combination with the first aspect or any abovementioned possible implementation mode, in another possible implementation mode of the first aspect, the operation that the terminal device reports the each of the plurality pieces of the reporting information, corresponding to the respective one of the plurality of reference signals, including the RI may include the following operation.

The terminal device sends the each of the plurality pieces of reporting information to a sender of the respective one of the plurality of reference signals.

In combination with the first aspect or any abovementioned possible implementation mode, in another possible implementation mode of the first aspect, the operation that the terminal device reports the each of the plurality pieces of the reporting information, corresponding to the respective one of the plurality of reference signals, including the RI may include the following operation.

The terminal device sends a first message to a sender of at least one first reference signal in the plurality of reference signals, the first message including a piece of reporting information, corresponding to the first reference signal, including the RI. The first message may further include the RI in a piece of reporting information corresponding to at least one second reference signal in the plurality of reference signals.

A second aspect provides a wireless communication method, which may include the following operations.

A first transmission node receives reporting information sent by a terminal device. The reporting information, corresponding to a reference signal sent by the first transmission nodes includes an RI. A plurality of transmission nodes including the first transmission node serves the terminal device.

The first transmission node determines, according to the reporting information, a number of transmission layers through which a downlink signal is sent to the terminal device.

Accordingly, in the embodiments of the application, each of a plurality of transmission nodes serving the terminal device receive a respective one of a plurality pieces of reporting information sent by the terminal device. Each of the plurality pieces of reporting information, corresponding to a respective one of a plurality of reference signals sent by the plurality of transmission nodes, includes RIs. Then each of the plurality of transmission nodes may determine transmission layers through which a downlink signal is sent according to the RI in the each of the plurality pieces of reporting information corresponding to respective one of the plurality of reference signals sent by the plurality of transmission nodes, so that measurement and feedback of the reference signals are implemented to support transmission of multiple downlink channels.

In combination with the second aspect, in a possible implementation mode of the second aspect, the operation that the first transmission node determines, according to the reporting information, the number of the transmission layers through which the downlink signal is sent to the terminal device may include the following operation.

Negotiate, according to a value of the RI included in the reporting information, the number of the transmission layers through which the first transmission node sends the downlink signal to the terminal device is performed with other transmission nodes of the terminal device.

In combination with the second aspect or any abovementioned possible implementation mode, in another possible implementation mode of the second aspect, the operation that the first transmission node determines, according to the reporting information, the number of the transmission layers through which the downlink signal is sent to the terminal device may include the following operation.

The first transmission node determines, according to the value of the RI included in the reporting information and a preset number of the transmission layers, the number of the transmission layers through which the downlink signal is sent to the terminal device.

The preset number of the transmission layers may be the number of the transmission layers obtained by negotiation between the first transmission node and the transmission nodes of the terminal device in advance for the first transmission node to send the downlink signal to the terminal device.

In combination with the second aspect or any abovementioned possible implementation mode, in another possible implementation mode of the second aspect, the operation that the first transmission node determines, according to the value of the RI included in the reporting information and the preset number of the transmission layers, the number of the transmission layers through which the downlink signal is sent to the terminal device may include the following operation.

A smaller number among a number of transmission layers corresponding to the value of the RI and the preset number of the transmission layers is determined as the number of the transmission layers through which the first transmission node sends the downlink signal to the terminal device.

In combination with the second aspect or any abovementioned possible implementation mode, in another possible implementation mode of the second aspect, the method may further include the following operation.

The first transmission node renegotiates, according to the reporting information sent by the terminal device for many times, the number of the transmission layers through which the first transmission node sends the downlink signal to the terminal device with the other transmission nodes of the terminal device to update the preset number of the transmission layers.

In combination with the second aspect or any abovementioned possible implementation mode, in another possible implementation mode of the second aspect, a sum of the number of the transmission layers through which the first transmission node sends the downlink signal to the terminal device and numbers of transmission layers through which the other transmission nodes send downlink signals to the terminal device may be less than or equal to a value corresponding to a capability of the terminal device.

A third aspect provides a terminal device, which is configured to execute the method in the first aspect or any possible implementation mode of the first aspect. Specifically, the terminal device includes functional modules configured to execute the method in the first aspect or any possible implementation mode of the first aspect.

A fourth aspect provides a transmission node, which is configured to execute the method in the second aspect or any possible implementation mode of the second aspect. Specifically, the transmission node includes functional modules configured to execute the method in the second aspect or any possible implementation mode of the second aspect.

A fifth aspect provides a terminal device, which includes a processor, a memory and a transceiver. The processor, the memory and the transceiver communicate with one another through an internal connecting path to transmit control signals and/or data signals to enable the terminal device to execute the method in the first aspect or any possible implementation mode of the first aspect.

A sixth aspect provides a transmission node, which includes a processor, a memory and a transceiver. The processor, the memory and the transceiver communicate with one another through an internal connecting path to transmit control signals and/or data signals to enable the transmission node to execute the method in the second aspect or any possible implementation mode of the second aspect.

A seventh aspect provides a computer-readable medium, which is configured to store computer programs, the computer programs including instructions configured to execute the method in each aspect or any possible implementation mode.

An eighth aspect provides a computer program product including instructions, which runs on a computer to enable the computer to execute the method in each aspect or any possible implementation mode.

BRIEF DESCRIPTION OF DRAWINGS

In order to describe the technical solutions of the embodiments of the application more clearly, the drawings required to be used in descriptions about the embodiments or a conventional art will be simply introduced below. It is apparent that the drawings described below are only some embodiments of the application. Other drawings may further be obtained by those of ordinary skill in the art according to these drawings without creative work.

DETAILED DESCRIPTION

The technical solutions in the embodiments of the application will be described below in combination with the drawings in the embodiments of the application. It is apparent that the described embodiments are not all embodiments but part of embodiments of the application. All other embodiments obtained by those of ordinary skill in the art based on the embodiments in the application without creative work shall fall within the scope of protection of the application.

Optionally, the technical solutions of the embodiments of the application may be applied to various communication systems, for example, a Global System of Mobile Communication (GSM), a Code Division Multiple Access (CDMA) system, a Wideband Code Division Multiple Access (WCDMA) system, a General Packet Radio Service (CPRS), a Long Term Evolution (LTE) system, an LTE Frequency Division Duplex (FDD) system, LTE Time Division Duplex (TDD) system, a Universal Mobile Telecommunication System (UMTS), a Worldwide Interoperability for Microwave Access (WiMAX) communication system or a future 5th-Generation (5G) system (which may also be called a New Radio (NR) system).

Figure 1:
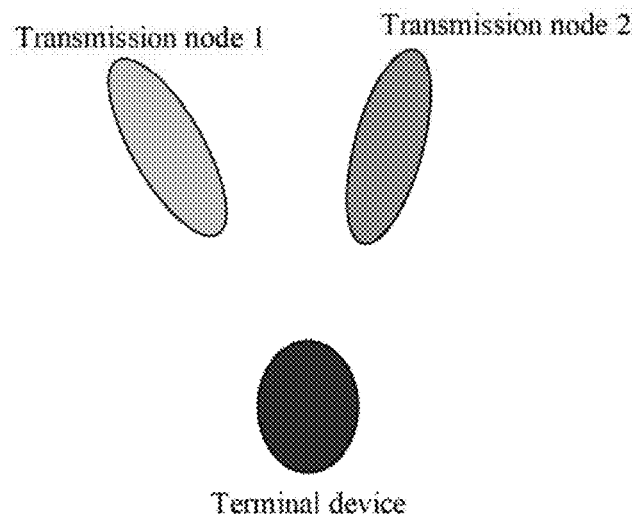
FIG. 1 is a schematic diagram of a wireless communication system according to an embodiment of the application.
Figure 2:
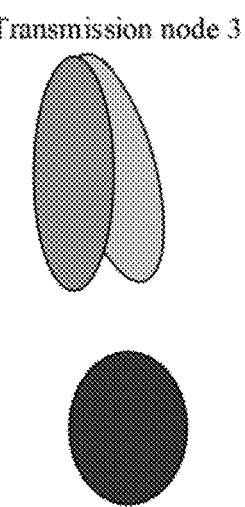
FIG. 2 is a schematic diagram of a wireless communication system according to an embodiment of the application.

FIGS. 1 and 2 are schematic diagrams of a wireless communication system according to an embodiment of the application.

As shown in FIG. 1, multiple transmission nodes (for example, a transmission node 1 and a transmission node 2) may jointly send downlink channels or signals to a terminal device.

Or, a network side may send downlink channels or signals to the terminal device through multiple sending beams (for example, a sending beam 1 and a sending beam 2).

The multiple sending beams may be from the same transmission node (for example, as shown in FIG. 2, from a transmission node 3) or from different transmission nodes (for example, as shown in FIG. 1, from the transmission nodes 1 and 2 respectively).

Optionally, the terminal device in FIGS. 1 and 2 may refer to an access terminal, User Equipment (UE), a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in a future 5G network, a terminal device in a future evolved Public Land Mobile Network (PLMN) or the like.

Optionally, the transmission node shown in FIGS. 1 and 2 may be a device communicating with the terminal device. The transmission node may provide communication coverage for a specific geographical region and may communicate with a terminal device (for example, UE) in the coverage. Optionally, the transmission node may be a Base Transceiver Station (BTS) in the GSM or the CDMA system, may also be a NodeB (NB) in the WCDMA system, and may further be an Evolutional Node B (eNB or eNodeB) in the LTE system or a wireless controller in a Cloud Radio Access Network (CRAN). Or the transmission node may be a relay station, an access point, a vehicle-mounted device, a wearable device, a network-side device in the future 5G network, a network device in the future evolved PLMN or the like.

Optionally, the transmission node may be called a Transmission Reception Point (TRP).

Optionally, the multiple transmission nodes in the embodiments of the application may be controlled by one control device. Or, the multiple transmission nodes in the embodiments of the application include one master transmission node that controls the other transmission nodes.

Optionally, the 5G system or network may also be called a New Radio (NR) system or network.

It is to be understood that terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B, and independent existence of B. In addition, character "/" in the disclosure usually represents that previous and next associated objects form an "or" relationship.

Figure 3:
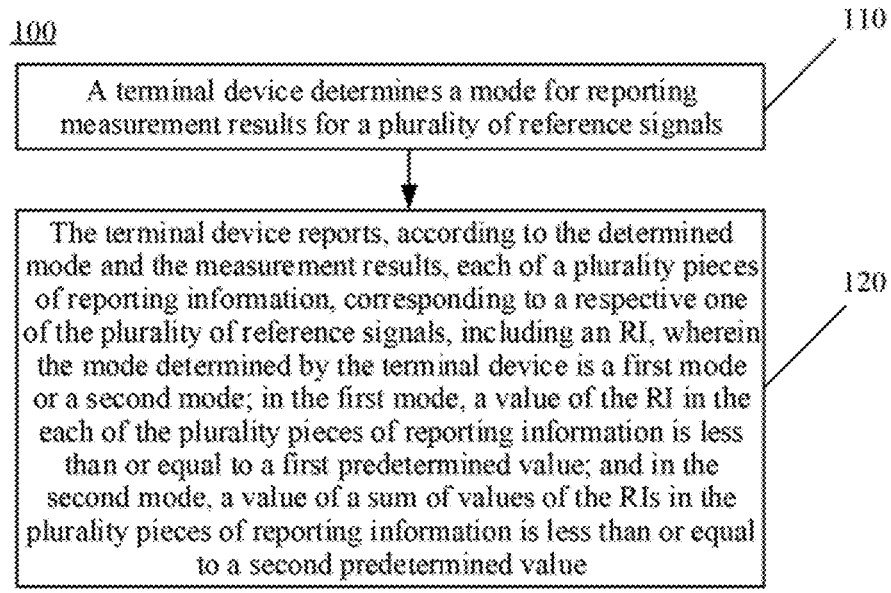
FIG. 3 is a schematic flowchart of a wireless communication method according to an embodiment of the application.

FIG. 3 is a schematic flowchart of a wireless communication method 100 according to an embodiment of the application. The method 100 may optionally be applied, but not limited, to the system shown in FIG. 1. The method 100 includes at least part of the following contents.

In 110, a terminal device determines a mode for reporting measurement results for multiple reference signals.

Optionally, the reference signal may be a Channel State Information Reference Signal (CSI-RS).

Optionally, the multiple reference signals are from multiple transmission nodes jointly serving the terminal device or from multiple downlink sending beams.

Optionally, each of the multiple reference signals correspond to a respective one of the multiple transmission nodes, namely a transmission node sends a reference signal. A reference signal refers to a downlink signal that is configured and sent.

Optionally, the multiple downlink beams may be from the same transmission node, or different downlink beams are from different transmission nodes.

Optionally, each of the multiple downlink sending beams may correspond to a respective one of the multiple reference signals, namely a reference signal is sent through a downlink sending beam.

In 120, according to the determined mode and the measurement results, the terminal device reports each of multiple pieces of reporting information, corresponding to a respective one of the multiple reference signals, including an RI.

Optionally, a value of the RI is used to represent a maximum number of transmission layers supported by the terminal device in a transmission channel corresponding to the reference signal.

Optionally, the terminal device may measure the multiple reference signals at different times. Or, the terminal device may also report the reporting information corresponding to the reference signals at different times.

Optionally, feedback information in the embodiment of the application may include the RI and include an index of the reference signal or an index of the reporting information or an index of the transmission node.

Optionally, the terminal device sends each of the multiple pieces reporting information, corresponding to a respective one of the multiple reference signals, including the RI to a sender of the respective one of the multiple reference signals.

Optionally, the terminal device sends a first message to a sender (senders) of at least one first reference signal in the multiple reference signals. The first message includes a piece of reporting information, corresponding to the first reference signal, including the RI. The first message further includes the RI in a piece of reporting information corresponding to at least one second reference signal in the multiple reference signals.

For example, there are three reference signals. For example, a reference signal 1, reference signal 2 and reference signal 3 from a transmission node 1, a transmission node 2 and a transmission node 3 respectively. Reporting information corresponding to the reference signal 1 may be sent to the transmission node 1. Reporting information corresponding to the reference signal 2 and the reference signal 3 may be sent to the transmission node 2. Reporting information for the reference signal 1, the reference signal 2 and the reference signal 3 may be sent to the transmission node 3.

Whether to send the reporting information corresponding to other reference signal to the sender of a certain reference signal may specifically be determined according to a practical condition. For example, may be determined according to a priority of the transmission node. For example, if the priority is higher, the reporting information corresponding to the other reference signal is needed less to be sent thereto. For the above example, a priority of the transmission node 1 is higher than that of the transmission node 2, and the priority of the transmission node 2 is higher than that of the transmission node 3.

Optionally, when the multiple reference signals are from different transmission nodes respectively, the terminal device may send the reporting information corresponding to the reference signal sent by each transmission node to the respective transmission node.

Optionally, when the multiple reference signals are from different sending beams respectively, the terminal device may send, to each sender of the sending beams, the reporting information corresponding to the reference signal sent by the each sender.

Optionally, the reporting mode determined by the terminal device is a first mode or a second mode.

Optionally, in the first mode, a value of the RI in each of the plurality pieces of reporting information corresponding to a respective one of the multiple reference signals does not exceed a first predetermined value.

Optionally, the first predetermined value is less than or equal to a value corresponding to a capability of the terminal device and/or less than or equal to a number of ports, configured for the terminal device, corresponding to each reference signal.

Specifically, in the first mode, the value of the RI in the reporting information, corresponding to any reference signal, of the terminal device does not exceed the first predetermined value. The terminal device may not consider a sum of values of the RIs in the reporting information corresponding to the multiple reference signals. In this mode, the transmission nodes of the multiple reference signals, after receiving the reporting information, may coordinate to ensure that a total number of transmission layers for downlink channels sent to the terminal device is less than the value corresponding to the capability of the terminal device.

Optionally, in the second mode, a value of the sum of the values of the RIs in the multiple pieces of reporting information corresponding to the respective multiple reference signals may not exceed a second predetermined value.

Specifically, in the second mode, the terminal device may determine the RI in the reporting information corresponding to each reference signal to ensure that the sum of the values of the RIs in the multiple pieces of reporting information corresponding to the respective multiple reference signals does not exceed a specific value. For example, not exceed the value corresponding to the capability of the terminal device.

Optionally, the second predetermined value is less than or equal to the value corresponding to the capability of the terminal device.

In this mode, the transmission nodes of the multiple reference signals, after receiving the reporting information, may directly determine the number of the transmission layers for sending to the terminal device according to the values of the RIs reported by the terminal device.

In the second mode, when the multiple transmission nodes are all connected with the terminal device and if backhauls among the multiple transmission nodes are not ideal, namely the transmission nodes may not rapidly implement information interaction with each other, the fact that the layer numbers of data flows sent to the terminal device by the multiple transmission nodes exceed the capability of the terminal device may be avoided, and system resource waste caused by the fact that the terminal device fails to implement demodulation or discards part of data may be avoided.

Optionally, in the embodiment of the application, the terminal device determines the reporting mode for the reporting information in the following two manners.

In one manner, when the terminal device does not receive a configuration by a network device for the reporting mode, a default reporting mode, for example, the first mode, may be adopted for reporting. If the configuration for the reporting mode is received, a reporting mode configured by the network device may be adopted for reporting, for example, the second mode configured by the network device for reporting. In this manner, the network device may configure the second mode only, and if it is determined that the terminal device is needed to adopt the first mode for reporting, the network device may not make any configuration.

In the other manner, the default reporting mode does not exist. The network device configures the reporting, mode, and the terminal device adopts the reporting mode configured by the network device for reporting.

Optionally, in the embodiment of the application, when the network device configures the second reporting mode, the configuration information further contains the first predetermined value.

Optionally, in the embodiment of the application, when the network device configures the second reporting mode, the configuration information further contains the second predetermined value.

Optionally, in the embodiment of the application, when the network device configures the second reporting mode, the configuration information further contains the value of the RI in the reporting information corresponding to each reference signal.

Optionally, in the second mode, the value of the RI in the reporting information corresponding to each reference signal is a third predetermined value.

Optionally, the third predetermined value is obtained by lower rounding a value obtained by dividing the value corresponding to the capability of the terminal device by the number of the multiple reference signals.

The number of the multiple reference signals may be equal to the number of PDCCHs required to be received at the same time or equal to the number of PDSCHs required to be received at the same time or a sum of the numbers of the PDCCHs and PDSCHs required to be received at the same time (the PDCCHs and the PDSCHs are required to be received at the same time).

Optionally, the third predetermined value is equal to a minimum value among the value corresponding to the capability of the terminal device and the number of ports corresponding to the corresponding reference signal.

Optionally, in the embodiment of the application, configurations of different reference signals in the configuration information for configuration of the reporting information for the reference signals are distinguished through indexes of the reference signals.

In the implementation mode, the configuration information may be carried in a setting configuration for the reference signal, or carried in a triggering signal triggering the terminal device to measure the reference signal, or carried in Downlink Control Information (DCI) dedicated to first configuration information.

The setting configuration of the reference signal may be a CSI-RS resource setting configuration or a CSI-RS setting configuration, and is used to configure how to receive the reference signal.

Optionally, in the embodiment of the application, the configurations of different reference signals in the configuration information for configuration of the reporting information for the reference signals are distinguished through indexes of the reporting information corresponding to the reference signals.

In the implementation mode, the first configuration information may be carried in a setting configuration for the reporting information, or carried in a triggering signal triggering the terminal device for reporting, or carried in the DCI dedicated to the first configuration information. The setting configuration for the reporting information may be called a reporting setting configuration, and is used to configure how to send the reporting.

For understanding the application more clearly, the embodiments of the application will be described below in combination with the first mode and the second mode respectively.

The First Mode

The network side may send different NR-PDCCHs and NR-PDSCHs to UE through two TRPs or two antenna panels or two beams. For supporting such a transmission solution, the network side may send different CSI-RSs (recorded as a CSI-RS 1 and a CSI-RS 2 respectively, different CSI-RSs being distinguished through different CSI-RS resource indicators) on different TRPs and simultaneously configure the UE to measure the two signals (there may be corresponding CSI-RS resource setting configurations and reporting setting configurations).

The UE measures the CSI-RS 1 and the CSI-RS 2 and feeds back corresponding RIs respectively. The maximum RI of the feedback RIs does not exceed a capability N of the UE.

The network side, after receiving the two RIs ensure that a total number of transmissions layer for transmission does not exceed the capability N of the UE according to coordination between the two TRPs or antenna panels or beams.

Coordination between networks may be coordination between TRPs of the same cell, and may also be coordination between TRPs of different cells (for example, through an X2 interface).

Interaction for the above coordination may be divided into rapid interaction and slow interaction (semi-static interaction). The rapid interaction is applied to coordination between the TRPs of the same cell, and the slow interaction is applied to coordination between the TRPs of the same cell and different cells.

Rapid interaction means that transmission layers for transmission by different TRPs may rapidly change when the two TRPs simultaneously transmit the NR-PDSCHs to the same UE.

Slow interaction means that the numbers of layers for transmission by different TRPs may change relatively slowly when the two TRPs simultaneously transmit the NR-PDSCHs to the same UE.

The Second Mode

The network side may send different NR-PDCCHs and NR-PDSCHs to UE through two TRPs or two antenna panels or two beams. For supporting such a transmission solution, the network side may send different CSI-RSs (recorded as a CSI-RS 1 and a CSI-RS 2 respectively, different CSI-RSs being distinguished through different CSI-RS resource indicators) on different TRPs and simultaneously configure the UE to measure the two signals (there may be corresponding CSI-RS resource setting configurations and reporting setting configurations).

In order to avoid that layers exceeding a demodulation capability of the UE is scheduled for the UE, the following optional manners may be adopted for configuration of the network side.

A first manner: the network side configures maximum feedback RI values (N1, N2) for the CSI-RS 1 and the CSI-RS 2 (namely distinguished through indexes of reference signals) respectively or configures the maximum feedback RI values (N1, N2) for two pieces of reporting information (namely distinguished through indexes of reporting information), N1+N2 do not exceed the capability of the UE.

N1 and N2 may not be required to be explicitly configured and correspond to N/K as a default (N is a maximum value of the capability of the UE and K is the number of PDCCH/PDCCHs received by the UE at the same time). N/K includes a rounded up value and a lower rounded value. For example, if N=5 and K=2, (N1, N2) may have different combinations, for example, (2, 2), (2, 3) and (3, 2).

If there is no indicator in a CSI-RS or reporting information, a maximum value of the RI thereof may be default, namely<=min (maximum capability of the UE, CSI-RS port number).

A second manner: the network side configuration limits a sum of the maximum feedback R1 values (N1, N2), configured for the CSI-RS 1 and the CSI-RS 2 respectively, not to exceed the capability of the UE or limits a sum of the maximum feedback RI values (N1, N2), configured for the two pieces of reporting information, not to exceed the capability of the UE. N1+N2 do not exceed the capability of the UE.

A third manner: the TRP1 (master TRP) configures the UE to report multiple RIs in a piece of reporting information, for example, the UE simultaneously sends N1 and N2 to the TRP2 (slave TRP), and then the TRP2 may automatically limits layers sent by itself to ensure that the number of the practically transmitted layers does not exceed N.

Accordingly, in the embodiment of the application, the terminal device measures the multiple reference signals. The terminal device determines each of multiple pieces of the reporting information, corresponding to a respective one of the multiple reference signals, including the RI according to the measurement result. The terminal device sends the reporting information, corresponding to each of the multiple reference signals, including the RI to a network side. So that measurement and feedback for the reference signals are implemented to support transmission of multiple downlink channels. Moreover, the reporting mode determined by the terminal device for the reporting is the first mode or the second mode, so that the number of transmission layers of the downlink channels to be sent to the terminal device by the network side may be limited as much as possible on a terminal side.

Figure 4:
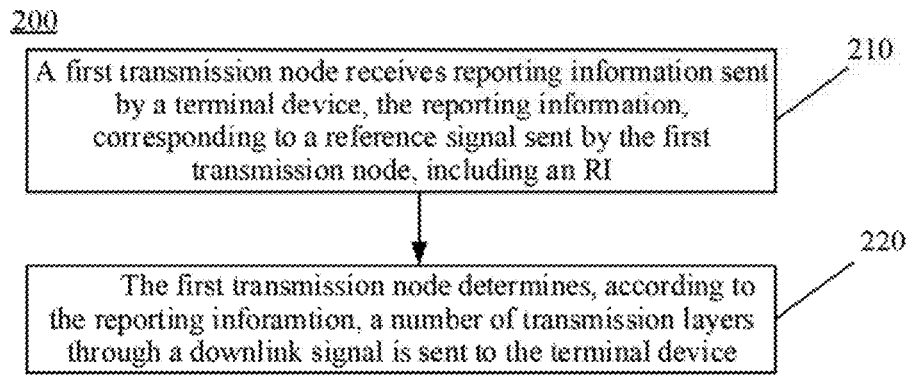
FIG. 4 is a schematic flowchart of a wireless communication method according to an embodiment of the application.

FIG. 4 is a schematic flowchart of a wireless communication method 200 according to an embodiment of the application. The method 200 may optionally be applied to the system shown in FIG. 1. The method 200 includes at least part of contents in the following contents.

In 210, a first transmission node receives reporting information sent by a terminal device. The reporting information, corresponding to a reference signal sent by the first transmission node, includes an RI. Multiple transmission nodes including the first transmission node serves the terminal device.

In 220, the first transmission node determines a number of transmission layers through which a downlink signal is sent to the terminal device according to the reporting information.

Optionally, the first transmission node negotiates the number of the transmission layers through which the first transmission node sends the downlink signal to the terminal device with the other transmission nodes of the terminal device according to a value of the RI in the reporting information.

In the embodiment, the first transmission node negotiates the number of the transmission layers through which the first transmission node sends the downlink signal to the terminal device with multiple other transmission nodes, so that a number of transmission layers through which the multiple transmission nodes send downlink channels to the terminal device may be prevented from exceeding a value corresponding to a capability of the terminal device.

Optionally, the first transmission node determines the number of the transmission layers through which the downlink signal is sent to the terminal device according to the value of the RI in the reporting and a preset number of transmission layers.

The preset number of the transmission layers is the number of the transmission layers obtained by negotiation between the first transmission node and the other transmission nodes of the terminal device in advance for the first transmission node to send the downlink signal to the terminal device.

In the embodiment, the first transmission node negotiates the number of the transmission layers through which the first transmission node sends the downlink signal to the terminal device with multiple other transmission nodes in advance, so that the number of the transmission layers through which the multiple transmission nodes send the downlink channels to the terminal device may be prevented from exceeding the value corresponding to the capability of the terminal device. Moreover, the number of transmission layers obtained by negotiation in advance may avoid a delay caused by performing negotiation about the number of transmission layers among the multiple transmission nodes after the reporting information reported by the terminal device is received.

Optionally, the smaller number among the number of transmission layers corresponding to the value of the RI and the preset number of the transmission layers is determined as the number of the transmission layers through which the first transmission node sends the downlink signal to the terminal device.

Optionally, the first transmission node renegotiating the number of the transmission layers through which the first transmission node sends the downlink signal to the terminal device with the other transmission nodes of the terminal device according to the reporting information sent by the terminal device for many times to update the preset number of the transmission layers.

Specifically, since the number of transmission layers obtained by negotiation among the multiple transmission nodes in advance may not meet a requirement of the terminal device, the multiple transmission nodes may negotiate the number of the transmission layers through which each transmission node sends the downlink signal to the terminal device again according to the value of the RI in the reporting information reported by the terminal device for many times and update the preset number of the transmission layers.

For example, a TRP1 and a TRP2 negotiate in advance to determine that the numbers of transmission layers through which the TRP1 and the TRP2 send downlink signals to the terminal device respectively are two layers and two layers. However, values of RIs in reporting information reported by the terminal device for many times are 1 and 3 for the TRP1 and the TRP2 respectively. In such case, the TRP1 and the TRP2 may negotiate again to determine that the layer numbers through which the downlink signals are sent to the terminal device are one layer and three layers, so that the requirement of the terminal device may be met better.

Optionally, a sum of the number of the transmission layers through which the first transmission node sends the downlink signal to the terminal device and the layer numbers of transmission layers through which the other transmission nodes send downlink signals to the terminal device is less than or equal to a value corresponding to a capability of the terminal device.

For example, a capability of a piece of UE is that supporting demodulation of at most four layers. If two TRPs send two and four layers respectively, the capability of the UE is exceeded, so that the UE may not implement demodulation or discards part of data, and the system resources are wasted. Therefore, the transmission layers sent by the multiple transmission nodes should not exceed the value corresponding to the capability of the terminal device.

Accordingly, in the embodiment of the application, the multiple transmission nodes serving the terminal device receive multiple pieces of reporting information sent by the terminal device respectively. Each of the multiple pieces of reporting information, corresponding to a respective one of reference signals sent by the transmission nodes, includes RIs. Then each transmission node may determine transmission layers through which a downlink signal is sent according to the RI in the reporting information corresponding to the reference signal sent by the each transmission node, so that measurement and feedback for the reference signals are implemented to support transmission of multiple downlink channels.

Figure 5:
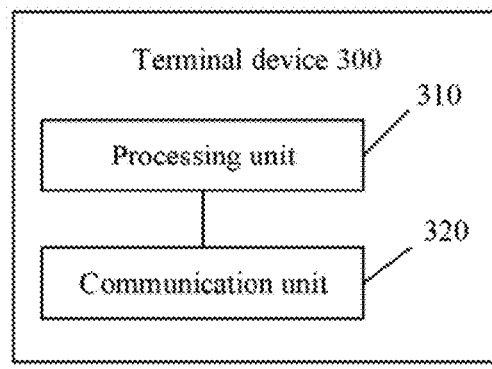
FIG. 5 is a schematic block diagram of a terminal device according to an embodiment of the application.

FIG. 5 is a schematic block diagram of a terminal device 300 according to an embodiment of the application. As shown in FIG. 5, the terminal device 300 includes a processing unit 310 and a communication unit 320.

The processing unit 310 is configured to determine a mode for reporting measurement results for multiple reference signals.

The communication unit 320 is configured to report, according to the determined mode and the measurement results, each of a plurality pieces of reporting information, corresponding to a respective one of the multiple reference signals, including an RI.

The reporting mode determined by the processing unit is a first mode or a second mode.

In the first mode, a value of the RI in the each of the plurality pieces of reporting information corresponding to each reference signal does not exceed a first predetermined value.

In the second mode, a value of a sum of values of the RIs in the multiple pieces of reporting information corresponding to the multiple reference signals does not exceed a second predetermined value.

Optionally, the terminal device 300 may correspond to the terminal device in the method embodiment, may implement corresponding operations of the terminal device and will not be elaborated herein for simplicity.

Figure 6:
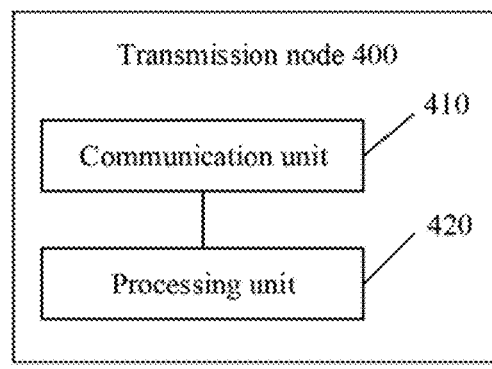
FIG. 6 is a schematic block diagram of a transmission node according to an embodiment of the application.

FIG. 6 is a schematic block diagram of a transmission node 400 according to an embodiment of the application. The transmission node 400 includes a communication unit 410 and a processing unit 420.

The communication unit 410 is configured to receive reporting information sent by a terminal device. The reporting information, corresponding to a reference signal sent by the transmission node, includes an RI.

The processing unit 420 is configured to determine, according to the reporting information, number of transmission layers through which a downlink signal is sent to the terminal device.

Optionally, the transmission node 400 may correspond to the first transmission node in the method embodiment, may implement corresponding operations of the first transmission node and will not be elaborated herein far simplicity.

Figure 7:
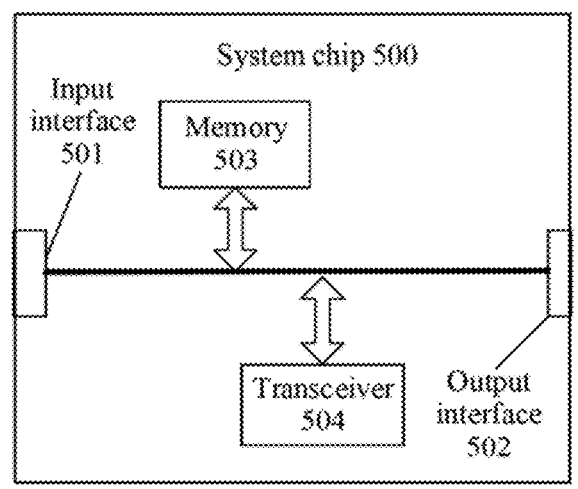
FIG. 7 is a schematic block diagram of a system chip according to an embodiment of the application.

FIG. 7 is a schematic structure diagram of a system chip 500 according to an embodiment of the application. The system chip 500 of FIG. 7 includes an input interface 501, output interface 502, processor 503 and memory 504, which may be connected through an internal communication connecting line. The processor 503 is configured to execute a code in the memory 504.

Optionally, when the code is executed, the processor 503 implements the method executed by the transmission node in the method embodiment. For simplicity, no more elaborations will be made herein.

Optionally, when the code is executed, the processor 503 implements the method executed by the terminal device in the method embodiment. For simplicity, no more elaborations will be made herein.

Figure 8:
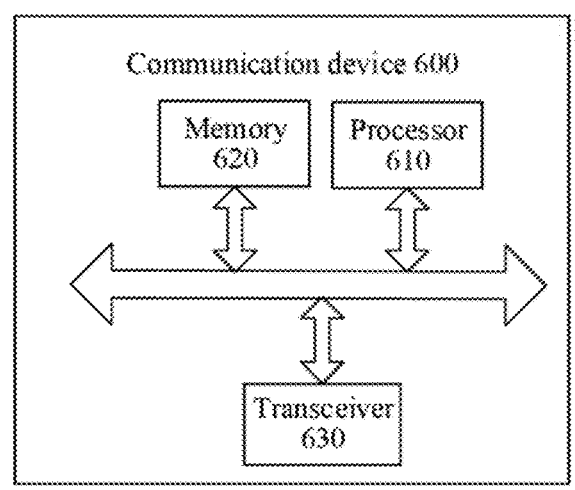
FIG. 8 is a schematic block diagram of a communication device according to an embodiment of the application.

FIG. 8 is a schematic block diagram of a communication device 600 according to an embodiment of the application. As shown in FIG. 8, the communication device 600 includes a processor 610 and a memory 620. Herein, the memory 620 may store program codes, and the processor 610 may execute the program codes stored in the memory 620.

Optionally, as shown in FIG. 8, the communication device 600 may include a transceiver 630, and the processor 610 may control the transceiver 630 for external communication.

Optionally, the processor 610 may call the program codes stored in the memory 620 to execute corresponding operations of the transmission node in the method embodiment. For similarity, elaborations will be omitted herein.

Optionally, the processor 610 may call the program codes stored in the memory 620 to execute corresponding operations of the terminal device in the method embodiment. For similarity, elaborations will be omitted herein.

It is to be understood that the processor in the embodiment of the application may be an integrated circuit chip and has a signal processing capability. In an implementation process, each operation of the method embodiment may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or other programmable logical device, discrete gate or transistor logical device and discrete hardware component, and may implement or execute each method, operation and logical block diagram disclosed in the embodiments of the application. The universal processor may be a microprocessor or the processor may also be any conventional processor and the like. The operations of the method disclosed in combination with the embodiments of the application may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only memory (ROM), a Programmable ROM (PROM) or Electrically Erasable PROM (EEPROM) and a register. The storage medium is located in a memory, and the processor reads information in the memory, and completes the operations of the methods in combination with hardware.

It can be understood that the memory in the embodiment of the application may be a volatile memory or a nonvolatile memory, or may include both the volatile and nonvolatile memories. The nonvolatile memory may be a ROM, a PROM, an Erasable PROM (EPROM), an Electrically EPROM (EEPROM) or a flash memory. The volatile memory may be a RAM, and is used as an external high-speed cache, it is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the application.

Those skilled in the art may clearly learn about that the specific working processes of the system, device and unit described above may refer to the corresponding processes in the method embodiment and will not be elaborated herein for convenient and brief description.

In some embodiments provided by the application, it is to be understood that the disclosed system, device and method may be implemented in another manner. Far example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the application may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the application substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the application. The abovementioned storage medium includes: various media capable of storing program codes such as a U disk, a mobile hard disk, a ROM, a RAM, a magnetic disk or an optical disk.

The above is only the specific implementation mode of the application and not intended to limit the scope of protection of the application. Any variations or replacements apparent to those skilled in the art within the technical scope disclosed by the application shall fall within the scope of protection of the application. Therefore, the scope of protection of the application shall be subject to the scope of protection of the claims.

The invention claimed is:

1. A wireless communication method, comprising:
determining, by a terminal device, a mode for reporting measurement results for a plurality of reference signals; and
reporting, by the terminal device according to the determined mode and the measurement results, each of a plurality pieces of reporting information, corresponding to a respective one of the plurality of reference signals, comprising a Rank Indicator (RI),
wherein the mode determined by the terminal device is a first mode or a second mode;
in the first mode, a value of the RI in the each of the plurality pieces of reporting information is less than or equal to a first predetermined value; and
in the second mode, a value of a sum of values of the RIs in the plurality pieces of reporting information is less than or equal to a second predetermined value,
wherein determining, by the terminal device, the mode for reporting the measurement results for the plurality of reference signals comprises:
when the terminal device does not receive configuration information configured by a network device for the mode, determining, by the terminal device, to report the measurement results for the plurality of reference signals by using the first mode.

2. The method of claim 1, wherein each of the plurality of reference signals is from a respective one of a plurality of transmission nodes serving the terminal device or a respective one of a plurality of downlink sending beams.

3. The method of claim 1, wherein the first predetermined value is less than or equal to at least one of a value corresponding to a capability of the terminal device or a number of ports, configured for the terminal device, corresponding to each of the plurality of reference signals.

4. The method of claim 1, wherein the second predetermined value is less than or equal to the value corresponding to the capability of the terminal device.

5. The method of claim 1, before determining, by the terminal device, the mode for reporting the measurement results for the plurality of reference signals, further comprising:
receiving, by the terminal device, configuration information, the configuration information being used to configure the mode.

6. The method of claim 5, wherein the configuration information is used to configure the terminal device to report the measurement results for the plurality of reference signals by using the first mode.

7. The method of claim 5, wherein the configuration information is used to configure the terminal device to report the measurement results for the plurality of reference signals by using of the second mode.

8. The method of claim 7, wherein the configuration information further contains the second predetermined value.

9. The method of claim 7, wherein the configuration information further contains the value of the RI in the each of the plurality pieces of reporting information.

10. The method of claim 7, wherein the value of the RI in the each of the plurality pieces of reporting information in the second mode is a third predetermined value.

11. The method of claim 10, wherein the third predetermined value is obtained by lower rounding a value obtained by dividing the value corresponding to the capability of the terminal device by a number of the plurality of reference signals; or,
the third predetermined value is equal to a minimum value among the value corresponding to the capability of the terminal device and the number of ports corresponding to the plurality of reference signals.

12. The method of claim 5, wherein configurations of different reference signals in the configuration information are distinguished through indexes of the different reference signals.

13. The method of claim 5, wherein the configurations of different reference signals in the configuration information are distinguished through indexes of reporting information corresponding to the different reference signals.

14. The method of claim 1, wherein reporting, by the terminal device, the each of the plurality pieces of the reporting information, corresponding to the respective one of the plurality of reference signals, comprising the RI comprises:
sending, by the terminal device, the each of the plurality pieces of reporting information to a sender of the respective one of the plurality of reference signals.

15. The method of claim 1, wherein reporting, by the terminal device, the each of the plurality pieces of the reporting information, corresponding to the respective one of the plurality of reference signals, comprising the RI comprises:
sending, by the terminal device, a first message to a sender of at least one first reference signal in the plurality of reference signals, the first message comprising a piece of reporting information, corresponding to the first reference signal, comprising a RI and
the first message further comprising a RI in a piece of reporting information corresponding to at least one second reference signal in the plurality of reference signals.

16. A terminal device, comprising: a processor, a memory and a transceiver, wherein the processor can control the transceiver for external communication, and the processor can call the program codes stored in the memory to execute the following operations:
determining a mode for reporting measurement results for a plurality of reference signals; and
reporting, according to the determined mode and the measurement results, each of a plurality pieces of reporting information, corresponding to a respective one of the plurality of reference signals, comprising a Rank Indicator (RI),
wherein the mode determined by the processor is a first mode or a second mode;
in the first mode, a value of the RI in the each of the plurality pieces of reporting information is less than or equal to a first predetermined value; and
in the second mode, a value of a sum of values of the RIs in the plurality pieces of reporting information is less than or equal to a second predetermined value,
wherein determining, by the terminal device, the mode for reporting the measurement results for the plurality of reference signals comprises:
when the terminal device does not receive configuration information configured by a network device for the mode, determining, by the terminal device, to report the measurement results for the plurality of reference signals by using the first mode.

17. The terminal device of claim 16, wherein each of the plurality of reference signals is from a respective one of a plurality of transmission nodes serving the terminal device or a respective one of a plurality of downlink sending beams.

18. A system chip, comprising: an input interface, an output interface, a processor and a memory, which can be connected through an internal communication connecting line, wherein the processor is configured to execute codes stored in the memory, when the codes are executed, the following operations are performed:
determining a mode for reporting measurement results for a plurality of reference signals; and
reporting, according to the determined mode and the measurement results, each of a plurality pieces of reporting information, corresponding to a respective one of the plurality of reference signals, comprising a Rank Indicator (RI),
wherein the mode determined by the processor is a first mode or a second mode;
in the first mode, a value of the RI in the each of the plurality pieces of reporting information is less than or equal to a first predetermined value; and
in the second mode, a value of a sum of values of the RIs in the plurality pieces of reporting information is less than or equal to a second predetermined value,
wherein determining, by the terminal device, the mode for reporting the measurement results for the plurality of reference signals comprises:
when the terminal device does not receive configuration information configured by a network device for the mode, determining, by the terminal device, to report the measurement results for the plurality of reference signals by using the first mode.

19. The system chip of claim 18, wherein each of the plurality of reference signals is from a respective one of a plurality of transmission nodes serving the terminal device or a respective one of a plurality of downlink sending beams.

\* \* \* \* \*